United States Patent Office 3,308,200
Patented Mar. 7, 1967

3,308,200
OXIDATIVE DEHYDROGENATION PROCESS
Laimonis Bajars, Princeton, N.J., assignor to Petro-Tex Chemical Corporation, Houston, Tex., a corporation of Delaware
No Drawing. Filed Oct. 22, 1965, Ser. No. 502,597
16 Claims. (Cl. 260—680)

This application is a continuation-in-part of my copending application Serial Number 249,997 filed January 8, 1963, entitled, "Dehydrogenation," now abandoned, which in turn was a continuation-in-part of my now abandoned applications Serial Number 52,776 filed August 30, 1960, entitled, "Improved Dehydrogenation Process," Serial Number 145,992 filed October 18, 1961, entitled, "Dehydrogenation of Hydrocarbons," Serial Number 145,993 filed October 18, 1961, entitled, "Dehydrogenation Process," Serial Number 156,954 filed December 4, 1961, entitled, "Process for Dehydrogenation," Serial Number 157,000 filed December 4, 1961, entitled, "Method of Dehydrogenation," Serial Number 207,105 filed July 2, 1962, and Serial Number 36,718 filed June 17, 1960, entitled, "Dehydrogenation Process."

This invention relates to a process for dehydrogenating organic compounds and relates more particularly to the dehydrogenation of organic compounds in the vapor phase at elevated temperatures in the presence of oxygen, chlorine and an improved inorganic contact mass.

It has been found recently that a great variety of dehydrogenatable organic compounds may be dehydrogenated by reacting a mixture of an organic compound containing at least one pair of adjacent carbon atoms, each of which possess at least one hydrogen atom, chlorine or a chlorine-liberating material, and oxygen under specified conditions at an elevated temperature, and at a reduced partial pressure of the organic compound, in the presence of certain metals or compounds thereof to obtain the corresponding unsaturated organic compound containing at least one

or

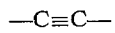

grouping.

I have found, quite unexpectedly, that this process may be improved so that increased selectivities and yields of unsaturated organic compound derivatives containing the

or

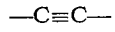

grouping are obtained more efficiently even with less chlorine and under less stringent process conditions, when such reaction is conducted in the presence of a contact mass comprising as a first component at least one element of a metal of Groups Ia and IIa (i.e. the alkali and alkaline earth metals) together with a second component which is a metal or metal compound of Periodic Table [1] Groups IVb, Vb, and VIb.

The process of this invention can be applied to a great variety of organic compounds to obtain the corresponding unsaturated derivative thereof. Such compounds normally will contain from 2 to 20 carbon atoms, at least one

grouping, that is adjacent carbon atoms each containing at least one hydrogen atom and having a boiling point

[1] Periodic Table, e.g., is found in Smith's Introductory College Chemistry, 3rd edition (Appleton-Century-Crofts, Inc., 1950).

below about 350° C. Such compounds may contain in addition to carbon and hydrogen, oxygen, halogens, nitrogen, and sulphur. Among the classes of organic compounds which are dehydrogenated by means of the novel process of this invention are alkanes, alkenes, alkyl halides, ethers, esters, aldehydes, ketones, organic acids, alkyl aromatic compounds, alkyl heterocyclic compounds, cyanoalkanes, cycloalkanes and the like. Illustrative dehydrogenation include ethylbenzene to styrene, isopropyl-benzene to α-methyl styrene, ethylcyclohexane to styrene, cyclohexane to benzene, ethane to ethylene and acetylene, ethylene to acetylene, propane to propylene, isobutane to isobutylene, n-butane to butene and butadiene-1,3, butene-1 to butadiene-1,3 and vinyl acetylene, cis or trans butene-2 to butadiene-1,3, butane or butene to vinyl acetylene, butadiene-1,3 to vinyl acetylene, methyl butene to isoprene, isobutane to isobutylene, propionaldehyde to acrolein, ethyl chloride to vinyl chloride, propionitrile to acrylonitrile, methyl isobutyrate to methyl methacrylate, and the like. Other representative materials which are readily dehydrogenated in the novel process of this invention include ethyl toluene, the alkyl chlorobenzenes, ethyl naphthalene, isobutyronitrile, propyl chloride, isobutyl chloride, ethyl fluoride, ethyl dichloride, butyl chloride, the chlorofluoroethanes, methylethyl ketone, diethyl ketone, methyl propionate, and the like. This invention is useful in the preparation of vinylidene compounds containing at least one

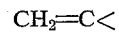

group, that is, a compound possessing at least one group containing a terminal methylene group attached by a double bond to a carbon atom, and 2 to 12 carbon atoms and is particularly useful in the dehydrogenation of hydrocarbons containing 2 to 5 carbon atoms or aliphatic nitriles of 3 to 4 carbon atoms. Preferred compounds to be dehydrogenated are hydrocarbons of 4 to 8 carbon atoms having at least four contiguous non-quaternary carbon atoms. Aliphatic acyclic hydrocarbons of from 4 to 5 or 6 carbon atoms are preferred. The invention is further particularly adapted to provide butadiene-1,3 from butane and butene and isoprene from isopentane and isopentene in high yields and excellent conversion and selectivity.

As shown by the examples below and the disclosures herein, the novel process of this invention is applicable to a great variety of organic compounds containing 2 to 20 carbon atoms and at least one pair of adjacent carbon atoms bonded together and each carbon atom possessing at least one hydrogen atom including the following: hydrocarbons including both alkanes and alkenes, especially those containing 2 to 6 or 8 carbons; carbocyclic compounds containing 6 to 12 carbon atoms, including both alicyclic compounds and aromatic compounds of the formula

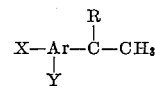

wherein Ar is phenyl or naphthyl, R is hydrogen or methyl and X and Y are hydrogen or alkyl radicals containing 1 to 4 carbon atoms, or halogen; alkyl ketones containing 4 to 6 carbon atoms; aliphatic aldehydes containing 3 to 6 carbon atoms; cyanoalkanes containing 2 to 6 carbon atoms; halo-alkanes and halo-alkenes containing 2 to 6 carbon atoms, particularly chloro- and fluoro-alkanes and the like. Vinylidene compounds containing the

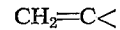

group, that is, containing a terminal methylene group attached by a double bond to a carbon atom, are readily obtained from organic compounds containing 2 to 12 carbon atoms and at least one.

group wherein adjacent carbon atoms are singly bonded and possess at least one hydrogen each. For example, vinylidene halides; vinyl esters; acrylic acid and alkyl- and halo-acrylic acids and esters; vinyl aromatic compounds; vinyl ketones; vinyl heterocyclic compounds; diolefins containing 4 to 6 carbon atoms, olefins containing 2 to 8 carbon atoms, and the like are obtained as products. The vinylidene compounds normally contain from 2 to 12 carbon atoms and are well known as a commercially useful class of materials for making valuable polymers and copolymers therefrom.

Useful feeds as starting materials may be mixed hydrocarbon streams such as refinery streams. For example, the feed material may be the olefin-containing hydrocarbon mixture obtained as the product from the dehydrogenation of hydrocarbons. Another source of feed for the present process is from refinery by-products. Although various mixtures of hydrocarbons are useful, the preferred hydrocarbon feed contains at least 50 weight percent butene-1, butene-2, n-butene and/or butadiene-1, 3 and mixtures thereof, and more preferably contains at least 70 percent n-butane, butene-1, butene-2 and/or butadiene-1,3 and mixtures thereof. Any remainder usually will be aliphatic hydrocarbons. The process of this invention is particularly effective in dehydrogenating acyclic aliphatic hydrocarbons to provide a hydrocarbon product wherein the major unsaturated product has the same number of carbon atoms as the feed hydrocarbon.

The chlorine-liberating material may be such as chlorine itself, hydrogen chloride, aliphatic chlorides of 1 to 6 carbon atoms such as methyl chloride or ethylene dichloride, carbon tetrachloride, ammonium chloride and the like. Preferably the chlorine-containing material will either volatilize or decompose at a temperature of no greater than 100° C. to liberate the required amount of chlorine or hydrogen chloride. Usually an amount of at least .005 or 0.01 mol of chlorine per mol of organic compound to be dehydrogenated will be used. It is one of the unexpected advantages of this invention that only very small amounts of chlorine are required. Less than 0.5 mol of chlorine, as 0.2 mol, per mol of organic compound to be dehydrogenated may be employed. Suitable ranges are such as from about .005 or 0.01 to 0.05, 0.1, 0.25 or 0.3 mol of chlorine per mol of the compound to be dehydrogenated. Excellent results are obtained when the chlorine is present in an amount of less than 0.3 mol of chlorine per mol of the compound to be dehydrogenated. It is understood that when a quantity of chlorine is referred to herein, both in the specification and the claims, that this refers to the calculated quantity of chlorine in all forms present in the vapor space under the conditions of reaction regardless of the initial source of the form in which the chlorine is present. For example, a reference to 0.05 mol of chlorine would refer to the quantity of chlorine present whether the chlorine was fed as 0.05 mol of $Cl_2$ or 0.10 mol of HCl. Preferably the chlorine will be present in an amount no greater than 5 or 10 mol percent of the total gaseous mixture in the dehydrogenation zone.

The minimum amount of oxygen employed will generally be at least about one-fourth mol of oxygen per mol of organic compound to be dehydrogenated. Large amounts as about 3 mols of oxygen per mol of organic compound may be used. Excellent yields of the desired unsaturated derivatives have been obtained with amounts of oxygen from about 0.4 to about 1.2 or 1.5 mols of oxygen per mol of organic compound and suitably may be within the range of about 0.4 to 2 mols of oxygen per mol of organic compound. Preferably the oxygen will be present in an amount of at least 0.4 or 0.6 mol per mol of compound to be dehydrogenated. Oxygen may be supplied to the reaction system as pure oxygen or as oxygen diluted with inert gases such as helium, carbon dioxide, as air and the like. In relation to chlorine, the amount of oxygen employed should be at least 2 mols of oxygen per mol of chlorine and preferably will be at least or greater than 2.50 mols of oxygen per mol of chlorine. A suitable ratio is at least 3.0 mols of oxygen per mol of chlorine.

While the total pressure on systems employing the process of this invention normally will be at or in excess of atmospheric pressure, vacuum may be used. Higher pressures, such as about 100 or 200 p.s.i.g. may be used. The partial pressure of the organic compound under reaction conditions usually will be equivalent to below 10 inches' mercury absolute when the total pressure is atmospheric. Better results and higher yields of desired product are normally obtained when the partial pressure of the organic compound is equivalent to less than about one-third or one-fifth of the total pressure. Also because the initial partial pressure of the hydrocarbon to be dehydrogenated is generally equivalent to less than about 10 inches of mercury at a total pressure of one atmosphere, the combined partial pressure of the hydrocarbon to be dehydrogenated plus the dehydrogenated hydrocarbon will also be equivalent to less than about 10 inches of mercury. For example, under these conditions, if butene is being dehydrogenated to butadiene, at no time will the combined partial pressure of the butene and butadiene be greater than equivalent to about 10 inches of mercury at a total pressure of one atmosphere. Preferably the hydrocarbon to be dehydrogenated should be maintained at a partial pressure equivalent to less than one-third the total pressure, such as no greater than six inches or no greater than four inches of mercury, at a total pressure of one atmosphere. The desired pressure is obtained and maintained by techniques including vacuum operations, or by using helium, organic compounds, nitrogen, steam and the like, or by a combination of these methods. Steam is particularly advantageous and it is surprising that the desired reactions to produce high yields of product are effected in the presence of large amounts of steam. Steam is particularly advantageous to obtain the required low partial pressure of the organic compound in the process. When steam is employed, the ratio of steam to organic compound is normally above about two mols of steam per mol of organic compound such as within the range of about 2 or 5 to 20 or 30 mols, although larger amounts of steam as high as 40 mols have been employed. The degree of dilution of the reactants with steam and the like is related to maintaining the partial pressure of the organic compound in the system at below about one-third atmosphere and preferably below 10 inches mercury absolute when the total pressure on the system is one atmosphere. For example, in a mixture of one mol of butene, three mols of steam and one mol of oxygen under a total pressure of one atmosphere the butene would have an absolute pressure of one-fifth of the total pressure, or roughly six inches of mercury absolute pressure. Equivalent to this six inches of mercury butene absolute pressure at atmospheric pressure would be butene mixed with oxygen and chlorine under a vacuum such that the partial pressure of the butene is six inches of mercury absolute. A combination of a diluent such as steam together with a vacuum may be utilized to achieve the desired partial pressure of the hydrocarbon. For the purpose of this invention, also equivalent to the six inches of mercury butene absolute pressure at atmospheric pressure would be the same mixture of one mol of butene, three mols of steam and one mol of oxygen under a total pressure greater than atmospheric, for example, a total pressure of 15 or 20 inches' mercury above atmospheric. Thus, when the total pressure on the reaction zone is greater than one atmosphere, the absolute values for the pressure of butene will be increased in direct proportion to the increase in total pressure above one atmosphere. Another feature of this invention is that the combined partial pressure of the hydrocarbon to be dehydrogenated plus the chlorine-liberating material will preferably also be equivalent to less than 10 inches of mecury, and preferably less than 6 or 4 inches of mercury, at a total pressure of one atmosphere. The lower limit of organic compound partial pressure will be dictated by commercial considerations and normally will be greater than about 0.1 inch of mercury absolute.

The temperature of the reaction is from above 400° C. to about 800° C. or 1000° C. Preferably the temperatures will be from at least 450° C. to 900° C., and generally will be at least about 500° C. The optimum temperature may be determined as by thermocouple at the maximum temperature of the reaction. Usually the temperature of reaction will be controlled between about 450° C. and about 750° C. or 800° C.

The flow rates of the gaseous reactants may be varied quite widely and good results have been obtained with organic compound gaseous flow rates ranging from about 0.25 to about 3 liquid volumes of organic compound per volume of reactor packing per hour, the residence or contact time of the reactions in the reaction zone under any given set of reaction conditions depending upon the factors involved in the reaction. Generally, the flow rates will be within the range of about 0.10 to 25 or higher liquid volumes of the hydrocarbon to be dehydrogenated, calculated at standard conditions of 0° C. and 760 mm. of mercury per volume of reactor space containing catalyst per hour (referred to as either LHSV or liquid v./v./hr.). Usually the LHSV will be between 0.15 and 15. The volume or reactor containing catalyst is that volume of reactor space including the volume displaced by the catalyst. For example, if a reactor has a particular volume of cubic feet of void space, when that void space is filled with catalyst particles the original void space is the volume of reactor containing catalyst for the purpose of calculating the flow rates. The residence or contact time of the reactants in the reaction zone under any given set of reaction conditions depends upon all the factors involved in the reaction. Contact times ranging from about 0.01 to about two seconds at about 450° C. to 750° C. have been used. A wider range of residence times may be employed, as 0.001 second to about 10 or 15 seconds. Residence time is the calculated dwell time of the reaction mixture in the reaction zone assuming the mols of product mixture are equivalent to the mols of feed mixture.

For conducting the reaction, a variety of reactor types may be employed. Fixed bed reactors may be used and fluid and moving bed systems are advantageously applied to the process of this invention. In any of the reactors suitable means for heat removal may be provided. Tubular reactors of large diameter which are loaded or packed with the solid contact mass are satisfactory.

Good results have been obtained when the exposed surface of the solid contact mass is greater than about 25 square feet, preferably greater than about 50 square feet per cubic foot of reactor as 75 or 100 or higher. Of course, the amount of catalyst surface may be much greater when irregular surface catalysts are used. When the catalyst is in the form of particles, either supported or unsupported, the amount of catalyst surface may be expressed in terms of the surface area per unit weight of any particular volume of catalyst particles. The ratio of catalytic surface to weight will be dependent upon various factors including the particle size, particle distribution, apparent bulk density of the carrier, and so forth. Typical values for the surface to weight ratio are such as about ½ to 200 square meters per gram,[2] although higher and lower values may be used.

Excellent results have been obtained by packing the reactor with catalyst particles as the method of introducing the catalytic surface. The size of the catalyst particles may vary widely but generally the maximum particle size will at least pass through a Tyler Standard Screen which has an opening of 2 inches, and generally the largest particles of catalyst will pass through a Tyler Screen with one inch openings. Thus, the particle size when particles are used preferably will be from about 10 microns to a particle size which will pass through a Tyler Screen with openings of 2 inches. If a carrier is used the catalyst may be deposited on the carrier by methods known in the art such as by preparing an aqueous solution or dispersion of the catalyst, mixing the carrier with the solution or dispersion until the active ingredients are coated on the carrier. The coated particles may then be dried, for example, in an oven at about 110° C. Various other methods of catalyst preparation known to those skilled in the art may be used. Very useful carriers are the Alundums, silicon carbide, the Carborundums, pumice, kieselguhr, asbestos, and the like. When carriers are used, the amount of catalyst composition on the carrier will generally be in the range of about 2 to 80 weight percent of the total weight of the active catalytic material plus carrier. Another method for introducing the required surface is to utilize as a reactor a small diameter tube wherein the tube wall is catalytic or is coated with catalytic material. If the tube wall is the only source of catalyst generally the tube will be of an internal diameter of no greater than one inch such as less than ¾ inch in diameter or preferably will be no greater than about ½ inch in diameter. The technique of utilizing fluid beds lends itself well to the process of this invention.

In the above descriptions of catalyst compositions, the composition described is that of the surface which is exposed in the dehydrogenation zone to the reactants. That is, if a catalyst carrier is used, the composition described as the catalyst refers to the composition of the surface and not to the total composition of the surface coating plus carrier. The catalytic compositions are intimate combinations or mixtures of the ingredients. These ingredients may or may not be present as alloys. Catalyst binding agents or fillers may be used, but these will not ordinarily exceed about 50 percent or 65 percent by weight of the catalytic surface. The defined catalytic components will be the main active constituents in the catalyst and the catalyst may consist essentially of the defined catalytic components. The weight percent of the defined catalytic atoms will generally be at least 20 percent, and are preferably at least 35 percent of the composition of the catalyst surface exposed to the reaction gases and will generally be at least 51 or about 80 atomic weight percent of any cations in the surface, such as at least 80 atomic percent of any metal cations in the surface.

The defined catalyst combinations may be employed in any form, e.g., as pellets, tablets, as coatings on carriers or supports, and the like, in both fixed and fluidized beds. Other methods of catalyst preparation known to those skilled in the art may also be used.

According to this invention, the catalyst is autoregenerative and thus the process is continuous. Little or no energy input is required for the process and it may be operated essentially adiabatically. Moreover, small amounts of tars and polymers are formed as compared to prior art processes. It is also an advantage of this invention that triple bond containing compounds are more easily obtained than with catalysts containing only one of the defined components.

---

[2] As measured by the Innes nitrogen absorption method on a representative unit volume of catalyst particles. The Innes method is reported in Innes, W. B., Anal. Chem., 23, 759 (1951).

In the examples given below the conversions, selectivities and yields are expressed as mol percent based on the mols of the compound to be dehydrogenated fed to the reactor. The temperature of reaction listed is approximately the maximum temperature in the reactor. The catalysts are present as fixed beds.

The Group Ia and IIa compounds used include, for example, oxides, hydroxides and salts such as the phosphates, sulfates, halides and the like. Useful compounds include, for example, lithium chloride, lithium oxide, lithium bromide, lithium fluoride, lithium phosphate, sodium hydroxide, sodium oxide, sodium chloride, sodium sulfate, beryllium oxide, sodium bromide, sodium iodide, sodium phosphate, sodium fluoride, potassium chloride, potassium bromide, potassium sulfate, potassium iodide, potassium nitrate, potassium citrate, potassium hydroxide, potassium oxide, potassium phosphate, rubidium chloride, rubidium bromide, rubidium iodide, rubidium oxide, magnesium acetate, magnesium bromide, magnesium oxide, magnesium iodide, calcium oxide, calcium acetate, calcium oxalate, calcium chloride, calcium bromide, calcium iodide, calcium phosphate, calcium fluoride, strontium oxide, strontium hydroxide, strontium chloride, strontium bromide, barium oxide, barium chloride, barium hydroxide, barium sulfate, barium bromide, barium iodide, beryllium chloride, and the like, and mixtures thereof. Preferred Group Ia and IIa metal elements are lithium, sodium, magnesium, potassium, calcium, strontium and barium, such as the oxides, phosphates, iodides, bromides, chlorides or fluorides of these metals. The oxides and halides and mixtures thereof are particularly preferred. Many of the Group Ia and IIa compounds may change during the preparation of the catalyst, during heating in a reactor prior to use in the process of this invention, or are converted to another form under the described reaction conditions, but such materials still function as an effective compound in the defined process. For example, the halides may be converted to the oxides or vice versa under the conditions of reaction. The amount of Group Ia metal compound or Group IIa metal compound with the additional metal or inorganic compound thereof may be varied quite widely and while small amounts, as low as one-tenth percent based on the total catalyst, have been used, much larger amounts may be employed in concentrations up to where the Group Ia or IIa metal compound is the larger constituent in the composition, such as up to 50 weight percent or more, as 95 percent. Normally up to 50 percent, and more usually about one to about twenty-five percent of the Group Ia or Group IIa compound, such as about one to ten percent, with the remainder being the defined second inorganic metal compound, is satisfactory. On an atomic basis, the combined amount of the metal atoms of Group Ia and/or IIa will be from at least about 0.001 atoms per atom of the defined second catalyst component and mixtures thereof. Excellent results are obtained at ratios of about 0.01 to 1.0 or 1.5 atoms of Group Ia and IIa per atom of the elements from the second specified group, such as from or about 0.01 or 0.02 to 0.5 atoms of Group Ia and IIa per atom of the elements from the second specified group.

A great variety of metals or metal compounds of Periodic Table Groups IVb, Vb, and VIb may be used as the second component in conjunction with the Group Ia and IIa metal compounds. Metals of the described second component group in elemental form may be employed and are included within the scope of this invention. The metals generally are changed to inorganic compounds thereof, at least on the surface, under the reaction conditions set forth herein. Particularly effective are inorganic compounds such as the oxides and salts including the phosphates and the halides, such as the iodides, bromides, chlorides and fluorides. Inorganic compounds which are useful as the second component in the compounded contact mass for the process of this invention include titanium oxide, hafnium oxide, zirconium oxide, tungstic acid, vanadium pentoxide, tantalum oxide, chromic oxide, chromic chloride, molybdenum oxide, molybdenum phosphate, vanadium oxyphosphate, and molybdenum phosphate. Preferably the catalyst will be solid under the conditions of reaction. Excellent catalysts are those comprising atoms of titanium, zirconium, vanadium, niobium, chromium and molybdenum, such as the oxides, phosphates, iodides, bromides, chlorides or fluorides of these elements. Many of the salts, oxides and hydroxides of the metals of the listed elements may change during the preparation of the catalyst, during heating in a reactor prior to use in the process of this invention, or are converted to another form under the described reaction conditions, but such materials still function as an effective compound in the defined process. For example, many of the metal nitrates, nitrites, carbonates, hydroxides, acetates, and the like may be converted to the corresponding oxide or chloride under the reaction conditions defined herein. Salts which are stable or partially stable at the defined reaction temperatures are likewise effective under the conditions of the described reaction, as well as such compounds which are converted to another form in the reactor. At any rate, the catalysts are effective if the defined catalyst is present in a catalytic amount in contact with the reaction gases. Useful catalyst combinations include zirconium oxide and lithium chloride, zirconium oxide and lithium oxide, hafnium oxide and magnesium oxide, titanium dioxide and lithium chloride or lithium hydroxide, vanadium pentoxide and lithium oxide or rubidium oxide, tungsten oxide and potassium bromide, chromic oxide and barium hydroxide.

To show the effect of the combination catalyst containing a metal element from Group Ia and IIa together with an element of the defined second component comparative examples are made. The comparative runs are made at identical conditions.

The runs are made in a Vycor reactor which is one inch internal diameter; the overall length of the reactor is about 36 inches with the middle 24 inches of the reactor being encompassed by a heating furnace; the bottom 6 inches of the reactor is empty; at the top of this 6 inches is a retaining plate, and on top of this plate are placed 16 inches of the catalyst particles. The catalyst particles are prepared by coating the designated catalytic compounds on ¼ x ¼ inch Vycor Raschig rings by pouring a thin aqueous slurry of the catalytic compound through the 16 inches of rings contained in the reactor. This procedure is repeated several times until the rings are thoroughly coated with the catalyst. The coated rings are then dried in the reactor under a stream of nitrogen at a reactor temperature of approximately 500° C. On top of the dried catalyst particles are placed 6 inches of uncoated ¼ x ¼ inch Vycor Raschig rings to form a preheat zone. The flow rates were calculated on the volume of the 16 inch long by 1 inch diameter portion of the reactor which was at or near the reaction temperature and is filled with catalyst particles. At a 700° C. maximum bed temperature, butene-2 of a purity of at least 99 mol percent is dehydrogenated to butadiene-1,3. The flow rate of butene-2 is maintained at 1 liquid volume of butene-2 (calculated at 0° C. and 760 mm. mercury) per volume of the 16 inch section of the reactor packed with catalyst which was at or near the reaction temperature per hour (liquid v./v. hr.) The flow rate of butene-2 is 0.22 liter per minute (calculated at 0° C. and 760 mm. mercury). Oxygen and steam are also fed to the reactor at a mol ratio of oxygen to butene-2 of 0.85, and a mol ratio of steam to butene-2 of 16. Hydrogen chloride is added as a 13 weight percent aqueous solution at a rate which is equivalent to 0.38 mol of chlorine (calculated as $Cl_2$) per mol of butene-2. The steam, butene-2, oxygen and aqueous solution of hydrogen chloride are added at the top of the reactor. The conversion of butene-2 is reported as mol percent. The percent selectivity to butadiene-1,3 and the resulting yield of butadiene-1,3 are reported as mol percent butadiene-1,3 based on the amount of butene-2 fed to the reactor.

*Example 1*

The catalyst is TiO₂. The selectivity is 55 percent.

*Example 2*

Example 1 is repeated with the exception that the catalytic coating on the Vycor rings consists of by weight 98 percent TiO₂ and 2 percent KCl. The selectivity is 68 percent.

*Example 3*

The catalyst is Nb₂O₅. The selectivity is 65 percent and the yield is 55 percent.

*Example 4*

Example 3 is repeated with the exception that the catalytic coating on the Vycor rings consists of by weight 95 percent Nb₂O₅ and 5 percent LiCl. The selectivity is 75 percent and the yield is 63 percent.

*Example 5*

In a one-inch internal diameter reactor butene-2 is dehydrogenated to butadiene-1,3 using a combination by weight of 95 percent MoO₃ and 5 percent BaO coated on ¼ inch Vycor Raschig rings. Steam is employed at a ratio of 16 mols of steam per mol of butene-2, and oxygen is added at a ratio of 0.85 mol of oxygen per mol of butene-2. Aqueous hydrogen chloride is added at a rate equivalent to 0.038 mol of chlorine per mol of butene-2. The flow rate of butene-2 is one LHSV (0.22 liter/min.). At a temperature of 700° C. the butene-2 is converted to butadiene at a conversion of 61 percent, and a selectivity of 52 percent.

*Examples 6 and 7*

The catalyst compositions listed herein are each coated on 6 mm. Vycor Raschig rings from water slurries thereof. A mixture of butene-2, oxygen, steam and hydrogen chloride is fed into the Vycor reactor containing the coated rings at a flow rate of one-half liquid v./v./hr. of butene-2 in a molar ratio of one mol of butene-2 to 0.85 mol of oxygen, 15 mols of water and 0.115 mol of chlorine (fed as aqueous 37 percent hydrogen chloride). The reaction temperature is listed. The yield of butadiene-1,3 and conversion and selectivity are set forth in the table below.

| Ex. | Coating | Yield, Percent | Conversion, Percent | Selectivity, Percent |
| --- | --- | --- | --- | --- |
| 6 | Zirconium Oxide plus 2.5% LiOH 650° C. | 38 | 76 | 50 |
| 7 | Titanium Oxide plus 2.5% LiOH 600° C. | 38 | 57 | 66 |

The process of this invention is particularly applicable to the dehydrogentaion of hydrocarbons, including dehydroisomerization and dehydrocyclization, to form a variety of acyclic compounds, cycloaliphatic compounds, aromatic compounds and mixtures thereof. For example, 2-ethylhexene-1 may be converted to a mixture of aromatic compounds such as toluene, ethyl benzene, p-xylene, o-xylene and styrene.

I claim:

1. The method for dehydrogenating hydrocarbon compounds having 2 to 20 carbon atoms to produce a dehydrogenated product having the same number of carbon atoms and the same structure with the exception of the removed hydrogen atoms which comprises heating in the vapor phase at a temperature of above 400° C. a hydrocarbon compound having a

group with oxygen in a molar ratio of greater than one-fourth mol of oxygen per mol of said hydrocarbon compound, chlorine in an amount of less than 0.5 mol of chlorine per mol of said hydrocarbon compound, the rtaio of the mols of said oxygen to the mols of said chlorine being at least 2.0, the partial pressure of said hydrocarbon compound being equivalent to less than one-half the total pressure in the presence of a catalyst comprising as its main active constituent (1) a compound selected from the group consisting of oxides, salts and hydroxides of alkali and alkaline earth metals and mixtures thereof, and (2) a metal or metal compound of Periodic Table Groups IV*b*, V*b* and VI*b* and mixtures thereof.

2. The method of claim 1 wherein the said compound is a hydrocarbon having from 2 to 12 carbon atoms.

3. The method of claim 1 wherein the said compound is an acyclic aliphatic hydrocarbon of 4 to 6 carbon atoms.

4. The method of claim 1 wherein the said compound is a hydrocarbon selected from the group consisting of n-butene, n-butane, isopentene, isopentane and mixtures thereof.

5. The method of claim 4 wherein the said temperature is at least 450° C.

6. The method of claim 4 wherein steam is employed in the said vapor phase in an amount of from 2 to 30 mols of steam per mol of said hydrocarbon.

7. The method of claim 4 wherein the oxygen is present in an amount of greater than 3.0 mols of oxygen per mol of said chlorine and the said chlorine is present in an amount of from .005 to 0.25 mol of chlorine per mol of said hydrocarbon.

8. The method of claim 4 wherein the alkali and alkaline earth metal compounds are present in an amount of from about .01 to 0.5 atom of the alkali or alkaline earth metal elements per atom of the metal elements of the said (2).

9. The method of claim 4 wherein the chlorine is present in an amount of no greater than 10 mol percent of the total gaseous mixture in the dehydrogenation zone.

10. A method for dehydrogenating hydrocarbons containing 4 to 5 carbon atoms which comprises reacting in the vapor phase at a temperature between 400° C. and about 750° C. an aliphatic hydrocarbon containing 4 to 5 carbon atoms with oxygen in a molar ratio of about 0.4 mol to about 2 mols of oxygen per mol of hydrocarbon, and above 0.001 mol to less than 0.2 mol per mol of aliphatic hydrocarbon of chlorine, at a partial pressure of said hydrocarbon of less than about one-third the total pressure in the presence of a mixture of (1) a compound selected from the group consisting of alkali metal oxides, alkaline metal hydroxides, alkaline earth metal oxides and alkaline earth metal hydroxides, and (2) an inorganic metal compound selected from the group consisting of Periodic Table Groups IV*b*, V*b*, VI*b* and mixtures thereof.

11. The method of claim 1 wherein the said (1) is selected from the group consisting of lithium, sodium, magnesium, potassium, calcium, strontium, barium and mixtures thereof.

12. The method of claim 11 wherein the said (2) is titanium.

13. The method of claim 11 wherein the said (2) is molybdenum.

14. The method of claim 11 wherein the said (2) is chromium.

15. The method of claim 11 wherein the said (2) is niobium.

16. The method of claim 1 wherein the said (1) and (2) are present as oxides, halides, or mixtures thereof.

References Cited by the Examiner

UNITED STATES PATENTS

| | | | |
|---|---|---|---|
| 2,719,171 | 9/1955 | Kalb | 260—669 |
| 3,207,806 | 9/1965 | Bajars | 260—680 |

DELBERT E. GANTZ, *Primary Examiner.*

G. E. SCHMITKONS, *Assistant Examiner.*